US012591618B1

(12) United States Patent　　(10) Patent No.:　US 12,591,618 B1
Lei et al.　　(45) Date of Patent:　Mar. 31, 2026

(54) VIDEO RETRIEVAL METHOD, DEVICE, AND MEDIUM

(71) Applicant: Army Academy of Armored Forces of PLA, Beijing (CN)

(72) Inventors: Zhen Lei, Beijing (CN); Yong Li, Beijing (CN); Zhenwei Li, Beijing (CN); Qinghua Liang, Beijing (CN)

(73) Assignee: Army Academy of Armored Forces of PLA, Fengtai District (CN)

( * ) Notice: Subject to any disclaimer, the term of this patent is extended or adjusted under 35 U.S.C. 154(b) by 0 days.

(21) Appl. No.: 19/011,903

(22) Filed: Jan. 7, 2025

(51) Int. Cl.
| | |
|---|---|
| *G06F 16/783* | (2019.01) |
| *G06F 16/738* | (2019.01) |
| *G06F 40/284* | (2020.01) |
| *G06V 10/60* | (2022.01) |
| *G06V 10/75* | (2022.01) |
| *G06V 20/40* | (2022.01) |

(52) U.S. Cl.
CPC .......... *G06F 16/783* (2019.01); *G06F 16/738* (2019.01); *G06F 40/284* (2020.01); *G06V 10/60* (2022.01); *G06V 10/751* (2022.01); *G06V 20/46* (2022.01)

(58) Field of Classification Search
CPC .... G06F 16/783; G06F 16/738; G06F 40/284; G06V 10/60; G06V 10/751; G06V 20/46
See application file for complete search history.

(56) References Cited

U.S. PATENT DOCUMENTS

2001/0005428 A1*　6/2001　Miyatake ................. G06K 9/00

FOREIGN PATENT DOCUMENTS

WO　　WO-2024005784 A1 *　1/2024　............. G06V 20/46

* cited by examiner

*Primary Examiner* — Anthony Bantamoi
(74) *Attorney, Agent, or Firm* — Tutunjian & Bitetto, P.C.

(57)　　　　ABSTRACT

This application provides a video retrieval method, a device, and a medium. The video retrieval method includes extracting a keyframe of a video from an Interactive Electronic Technical Manual (IETM) common source database (CSDB) in an IETM platform, transferring the keyframe to a Contrastive Language-Image Pre-training (CLIP) encoder, and storing the keyframe in a keyframe database. A CLIP image encoder is used to encode the keyframe to determine a fused vector of all keyframe features, and the fused vector is stored in a vector database as a video feature. A CLIP text encoder is used to encode video retrieval text to determine a text feature, and the text feature is stored in a text database. A similarity between the text feature and the video feature is calculated to determine a text-video similarity matrix. Video retrieval is performed based on the text-video similarity matrix, and determining a video retrieval result.

20 Claims, 5 Drawing Sheets

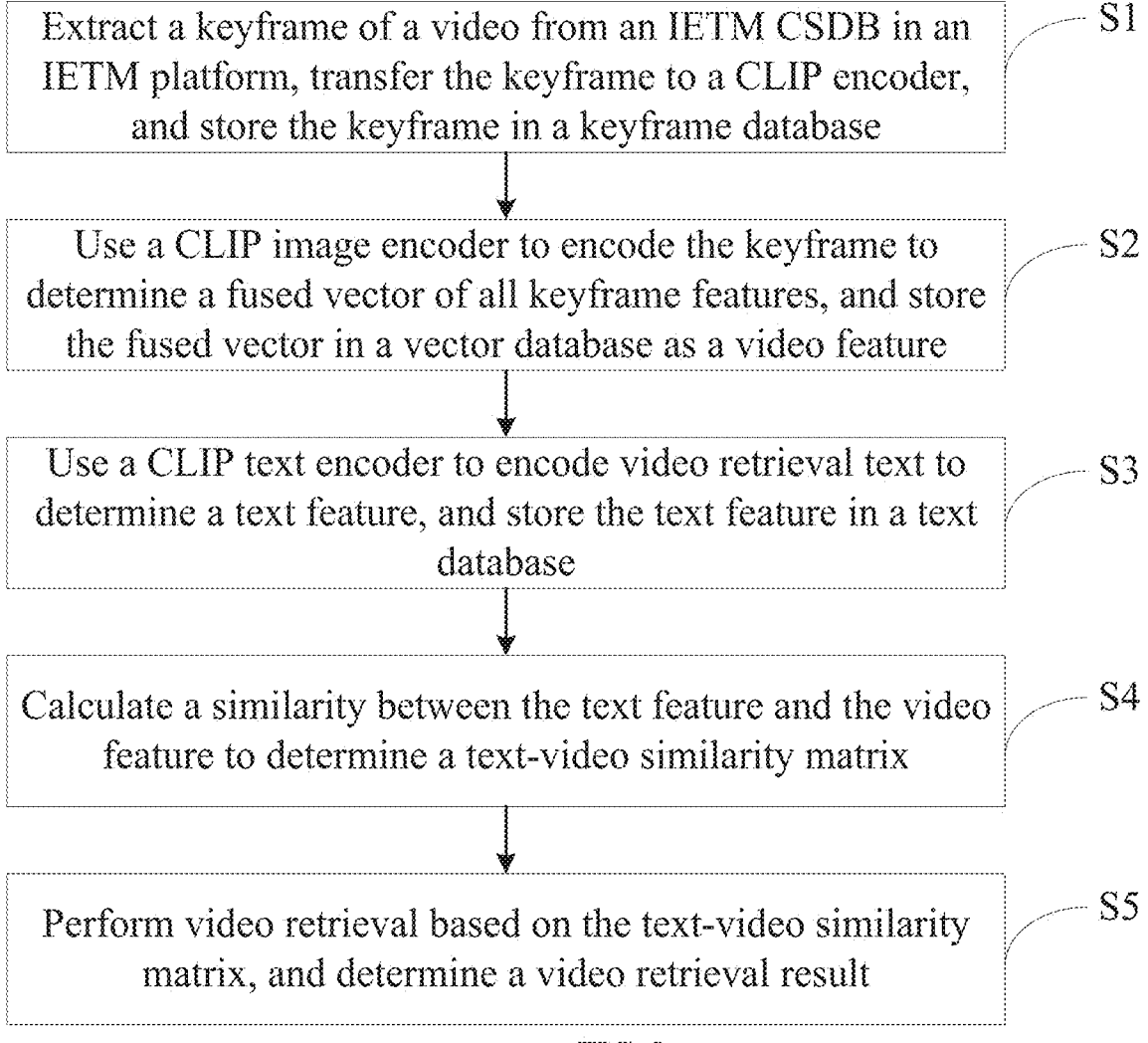

Extract a keyframe of a video from an IETM CSDB in an IETM platform, transfer the keyframe to a CLIP encoder, and store the keyframe in a keyframe database — S1

Use a CLIP image encoder to encode the keyframe to determine a fused vector of all keyframe features, and store the fused vector in a vector database as a video feature — S2

Use a CLIP text encoder to encode video retrieval text to determine a text feature, and store the text feature in a text database — S3

Calculate a similarity between the text feature and the video feature to determine a text-video similarity matrix — S4

Perform video retrieval based on the text-video similarity matrix, and determine a video retrieval result — S5

FIG. 2

VIDEO RETRIEVAL METHOD, DEVICE, AND MEDIUM

TECHNICAL FIELD

The present disclosure relates to the field of fast video retrieval in Interactive Electronic Technical Manual (IETM), and in particular, to a video retrieval method, a device, and a medium.

BACKGROUND

Interactive Electronic Technical Manual (IETM) can comprehensively apply advantages of computer multimedia, database, network, and other technologies to organize and manage complex technical materials such as operation manuals and maintenance manuals in an organic manner based on relevant standards, display text, tables, graphics, images, audios, videos, three-dimensional animations, and other forms on an electronic screen in an optimal way, and support interactive consultation to accurately display information required by operation, use, training, and equipment maintenance support personnel for users.

It is crucial for an IETM technician to quickly find a required video clip through video retrieval. At present, an IETM user first finds a corresponding video by matching a keyword of a query statement and a video label, and then locates a required video clip through normal browsing, fast forwarding, and other means. This method highly relies on the keyword and the video label, has low search efficiency, and is prone to missing a key video clip. The corresponding video found usually does not match and even significantly differs from video content that is really to be searched for.

With the rapid development of deep learning in the multimodal field, cross-modal video-text retrieval can understand content of the text and the video, thereby achieving matching between the video and the text. At present, a mainstream practice method is to encode the video and the text into feature vectors. Since vectors with similar meanings are also in similar positions in space, a cross-modal text-video retrieval task can be achieved by calculating a similarity between the vectors. Compared with traditional methods, content-based video retrieval is also closer to human's thinking logic. Especially as the Contrastive Language-Image Pre-training (CLIP) model is proposed, it is possible to achieve fast video retrieval in the IETM.

SUMMARY

An objective of the present disclosure is to provide a video retrieval method, an apparatus, a device, a medium, and a product, which can effectively improve training efficiency and video retrieval performance in the case of limited computing resources.

To achieve the above objective, the present disclosure provides the following technical solutions.

According to a first aspect, the present disclosure provides a video retrieval method, includes extracting a keyframe of a video from an IETM CSDB in an IETM platform, transferring the keyframe to a CLIP encoder, and storing the keyframe in a keyframe database. The IETM CSDB includes a video database, the keyframe database, a text database, and a vector database. The CLIP encoder includes a CLIP image encoder and a CLIP text encoder. An adapter is inserted into a transformer layer of the CLIP image encoder, and the adapter is used for parameter-efficient fine-tuning.

The CLIP image encoder is used to encode the keyframe to determine a fused vector of all keyframe features, and the fused vector is stored in the vector database as a video feature.

The CLIP text encoder is used to encode video retrieval text to determine a text feature, and the text feature is stored in the text database, where the video retrieval text is video retrieval text input by a client into the IETM platform.

A similarity between the text feature and the video feature is calculated to determine a text-video similarity matrix.

Video retrieval based on the text-video similarity matrix is performed, and a video retrieval result is determined. The IETM platform includes a communicatively-connected display device, and controls the communicatively-connected display device to display the video retrieval text and the video retrieval result, such that an operating device performs the video retrieval based on the video retrieval text.

According to a second aspect, the present disclosure provides a computer device, including a memory, a processor, and a computer program stored in the memory and executable on the processor, where the processor executes the computer program to implement the above video retrieval method.

According to a third aspect, the present disclosure provides a non-transitory computer-readable storage medium, storing a computer program thereon, where the computer program is executed by a processor to implement the above video retrieval method.

According to specific embodiments provided in the present disclosure, the present disclosure achieves the following technical effects: The present disclosure extracts a keyframe of a video from an IETM CSDB in an IETM platform, transfers the keyframe to a CLIP encoder, and stores the keyframe in a keyframe database. The CLIP encoder includes a CLIP image encoder and a CLIP text encoder, an adapter is inserted into a transformer layer of the CLIP image encoder, and the adapter is used for parameter-efficient fine-tuning, thereby increasing a training speed. The present disclosure is the first to apply a parameter-efficient fine-tuning technique based on content understanding to the field of fast video retrieval in IETM, which can improve efficiency of equipment support informationization to a certain extent. The CLIP image encoder and the CLIP text encoder of a CLIP model are used to link text and an image through contrastive learning. Keyframe features are merged into a fused vector through an average pooling operation, and the fused vector is used as a video feature. This achieves a better application result, and effectively improves training efficiency and video retrieval performance in the case of limited computing resources.

BRIEF DESCRIPTION OF THE DRAWINGS

To describe the technical solutions in the embodiments of the present disclosure or in the prior art more clearly, the following briefly describes the accompanying drawings required for the embodiments. Apparently, the accompanying drawings in the following description show merely some embodiments of the present disclosure, and a person of ordinary skill in the art may still derive other accompanying drawings from these accompanying drawings without creative efforts.

FIG. 2 is a schematic flowchart of a video retrieval method according to an embodiment of the present disclosure;

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are only some rather than all of the embodiments of the present disclosure. All other embodiments obtained by a person of ordinary skill in the art based on the embodiments of the present disclosure without creative efforts shall fall within the protection scope of the present disclosure.

To make the above objectives, features, and advantages of the present disclosure more obvious and easy to understand, the present disclosure will be further described in detail with reference to the accompanying drawings and specific implementations.

Figure 1:
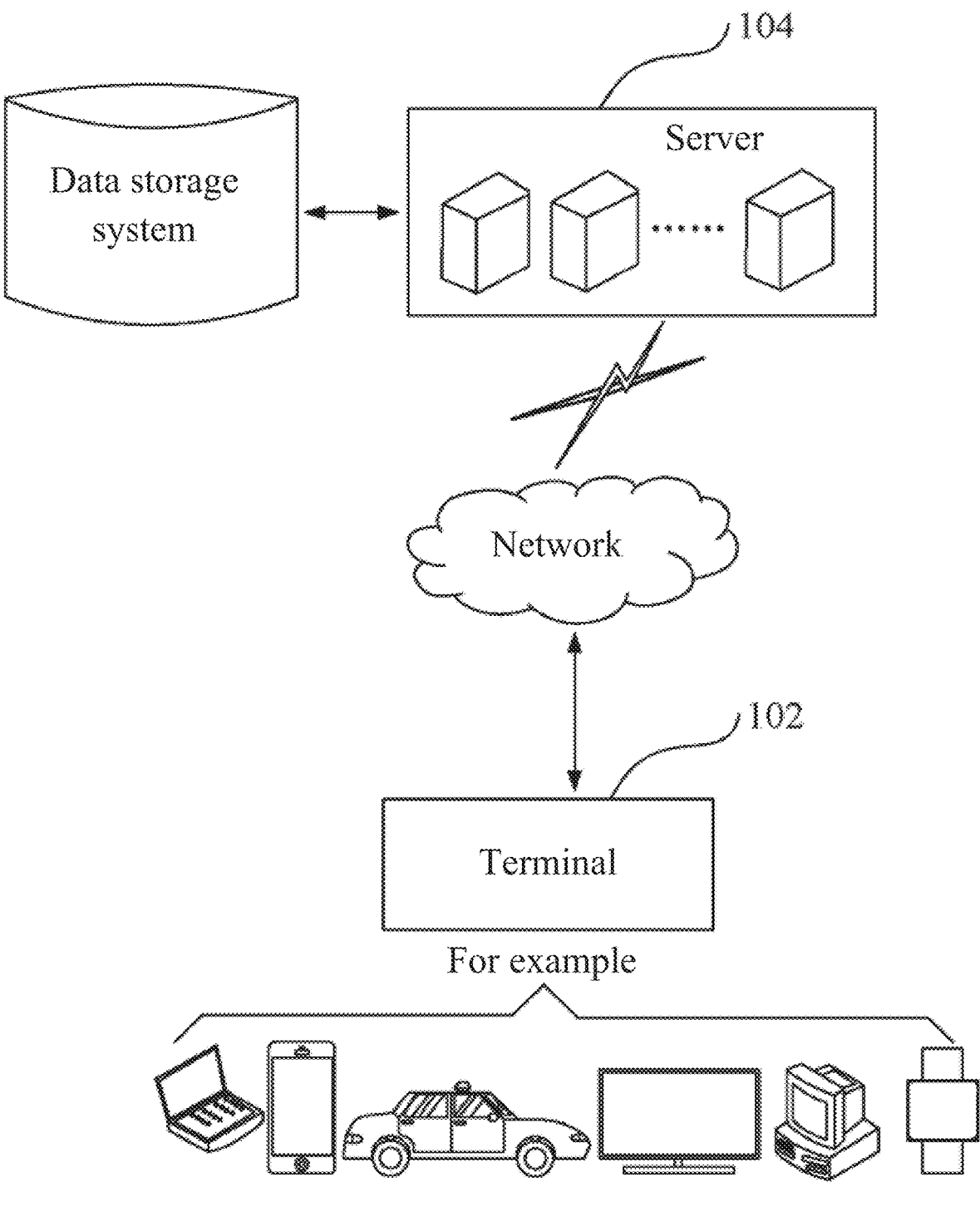
FIG. 1 shows an application environment of a video retrieval method according to an embodiment of the present disclosure.

An embodiment of the present disclosure provides a video retrieval method, which is executed by a computer device, as shown in FIG. 1. Specifically, the video retrieval method may be executed separately by the computer device such as a terminal or a server, or may be executed jointly by the terminal and the server. The above computer device may be hardware or software. When being the hardware, the computer device may be implemented as a distributed cluster constituted by a plurality of servers or terminal devices, or may be implemented as a single server or a single terminal device. When being embodied as the software, the computer device can be installed in the hardware devices listed above. The computer device may be implemented as a plurality of pieces of software or a plurality of software modules, for example, for providing distributed services, or may be implemented as a single piece of software or a single software module. This is not specifically limited herein.

In this embodiment of the present disclosure, as shown in FIG. 2, the video retrieval method includes the following steps:

S1: Extract a keyframe of a video from an IETM CSDB in an IETM platform, transfer the keyframe to a CLIP encoder, and store the keyframe in a keyframe database, where the IETM CSDB includes a video database, the keyframe database, a text database, and a vector database; the CLIP encoder includes a CLIP image encoder and a CLIP text encoder; an adapter is inserted into a transformer layer of the CLIP image encoder; and the adapter is used for parameter-efficient fine-tuning.

S2: Use the CLIP image encoder to encode the keyframe to determine a fused vector of all keyframe features, and store the fused vector in the vector database as a video feature.

S3: Use the CLIP text encoder to encode video retrieval text to determine a text feature, and store the text feature in the text database, where the video retrieval text is video retrieval text input by a client into the IETM platform.

S4: Calculate a similarity between the text feature and the video feature to determine a text-video similarity matrix.

S5: Perform video retrieval based on the text-video similarity matrix, and determine a video retrieval result, where the IETM platform includes a communicatively-connected display device, and controls the communicatively-connected display device to display the video retrieval text and the video retrieval result, such that an operating device performs the video retrieval based on the video retrieval text.

Figure 3:
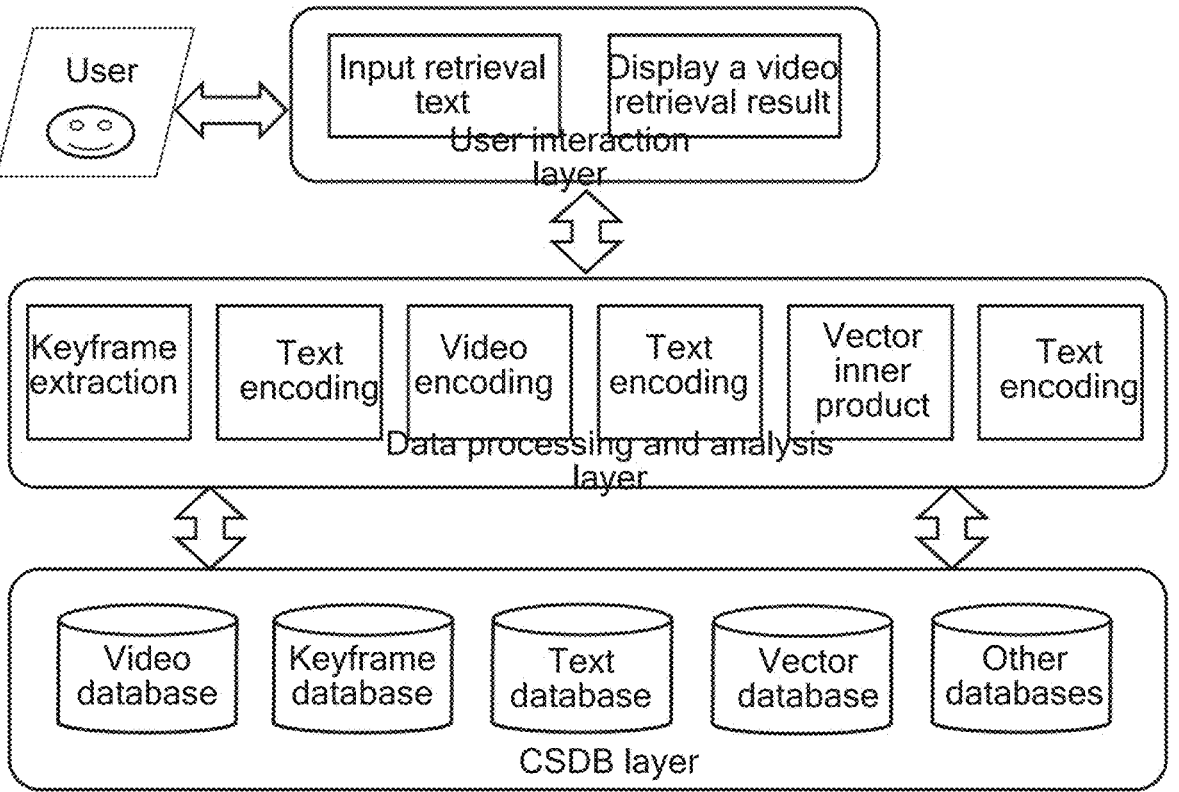
FIG. 3 is a schematic architecture diagram of an IETM platform according to an embodiment of the present disclosure.

In an exemplary embodiment, as shown in FIG. 3, the IETM platform includes an IETM CSDB layer, a data processing and analysis layer, and a user interaction layer. The IETM CSDB layer mainly includes the video database, the keyframe database, the text database, the vector database, and other databases. The IETM CSDB layer mainly stores all video files related to operation, use, and maintenance support in the IETM platform, and a keyframe image, a video label, retrieval keyword text, a video feature vector, and other data that are stored after each video experiences keyframe extraction. The data processing and analysis layer includes video keyframe extraction, text encoding, video encoding, calculation of an inner product between a video vector and a text vector, and matching between search text and video label text. The user interaction layer displays data retrieval text and the video retrieval result.

In an exemplary embodiment, the extracting a keyframe of a video from an IETM CSDB in an IETM platform specifically includes: extracting pixel brightness between two adjacent frames in the video based on an optical flow method to determine an optical flow feature; extracting a pixel difference between the two adjacent frames in the video based on a frame difference method to determine a frame difference feature; and determining the keyframe of the video based on the optical flow feature and the frame difference feature.

In an exemplary embodiment, the determining the keyframe of the video based on the optical flow feature and the frame difference feature specifically includes: evaluating the frame difference feature separately by using a frame difference mean, a frame difference variance, and a difference coefficient, and determining an evaluation result of the frame difference feature, where the difference coefficient is a ratio of the frame difference variance to the frame difference mean; and determining the keyframe of the video based on the optical flow feature and the evaluation result of the frame difference feature.

In a practical application, the keyframe extraction integrates the optical flow method and frame difference-based feature calculation. An optical flow is a spatial motion vector of a pixel in an image sequence. Based on an assumption that the pixel brightness between the adjacent frames is constant, the optical flow can capture motion information between images, thereby helping to identify the keyframe. A frame difference is a difference between two consecutive frames, which is obtained by calculating a pixel-level difference. The present disclosure comprehensively uses the frame difference mean, the frame difference variance, and the difference coefficient (the ratio of the frame difference variance to the frame difference mean) to evaluate a central tendency and a dispersion degree of the frame difference. The mean reflects an overall average level of the frame difference, while the variance reflects a fluctuation of the frame difference. The optical flow feature is combined with the three indicators of the frame difference feature to more comprehensively determine which frames have a significant change, and thus select the keyframe. Because a same keyframe is extracted from a same video each time by using a determined keyframe extraction scheme, it is possible to perform the keyframe extraction on a video in an IETM video database in advance and save an extracted keyframe to the keyframe database in an image format required in an IETM standard. This can efficiently load data, thereby increasing a training speed and saving space occupied by the data.

Based on the keyframe extraction method that integrates the optical flow feature and the frame difference feature, the present disclosure combines the optical flow feature and the three indicators of the frame difference feature to more comprehensively determine which frames have the significant change, and thus select the keyframe.

In an exemplary embodiment, the using the CLIP image encoder to encode the keyframe to determine a fused vector of all keyframe features specifically includes: using the CLIP image encoder to encode the keyframe to determine a keyframe feature; and performing an average pooling operation to merge all the keyframe features into the fused vector.

Further, the vector database stores the video feature. In this way, in next retrieval, the video feature can be loaded directly from the vector database without being recalculated, thereby speeding up the video retrieval.

In an exemplary embodiment, the using the CLIP text encoder to encode video retrieval text to determine a text feature specifically includes: using the CLIP text encoder to perform word segmentation, molecular word division, and tokenization on the video retrieval text to convert the video retrieval text into a token sequence, where the token sequence is the text feature.

In an exemplary embodiment, after the using the CLIP text encoder to encode video retrieval text to determine a text feature, the video retrieval method further includes: using the CLIP encoder to calculate a cosine distance between each text feature and each video feature based on symmetric cross entropy to generate an image-text pair;

determining, based on the cosine distance, whether a text feature and a video feature in the image-text pair are matched; and if the text feature and the video feature in the image-text pair are matched, storing the image-text pair in the IETM CSDB; or if the text feature and the video feature in the image-text pair are not matched, discarding the image-text pair.

In an exemplary embodiment, the determining, based on the cosine distance, whether a text feature and a video feature in the image-text pair are matched specifically includes: when a cosine distance of the image-text pair is within a first distance range, determining that the text feature and the video feature in the image-text pair are matched; or when a cosine distance of the image-text pair is within a second distance range, determining that the text feature and the video feature in the image-text pair are not matched. The first distance range is 0.9 to 1, and the second distance range is 0 to 0.1.

In a practical application, the cosine distance approaches 1 for a same image-text pair and 0 for different image-text pairs.

In a practical application, the present disclosure uses a smallest VIT-B/32 model in the CLIP model series. CLIP includes an image encoder (ResNet or ViT) and a text encoder (transformer), and uses contrastive learning to link text and an image.

Firstly, the text is encoded through the text encoder, and the image is encoded and regularized through the image encoder. Then, a cosine distance between each text feature and each image feature is calculated. To make the cosine distance approach 1 for the same image-text pair and approach 0 for the different image-text pairs, the symmetric cross entropy can be used as a loss function.

One key reason why the CLIP method performs better than previous models obtained from similar experiments is its scale, including a scale of a training dataset and a scale of computing power. A larger scale leads to a more significant improvement in the performance.

In a CLIP model experiment, its training dataset includes 400 million pieces of data collected from the Internet, and larger computing power is prepared. The pre-training model demonstrates a strong generalization capability, and therefore, can be applied to many downstream tasks.

Main bodies of the text encoder and the image encoder each are one transformer layer.

For an input sentence, the text encoder first needs to perform operations such as the word segmentation, the molecular word segmentation, and the tokenization to convert the input sentence into the token sequence.

The CLIP image encoder is also a ViT-B/32 model, which encodes the keyframe extracted from the IETM video to obtain the video feature. The vector database stores the video feature. In this way, in a test, the model can load the video feature directly from the vector database, and does not need to recalculate the video feature of the video database each time the model is started, thus fully utilizing a dual-tower structure of the model and increasing a retrieval speed.

The adapter is inserted into the transformer layer of the CLIP image encoder. The adapter is used for the parameter-efficient fine-tuning, and one of important goals of the adapter is to use fewer parameters. Therefore, compared with a fully connected feedforward layer, a hidden layer of the adapter performs 4×down-sampling with a hidden dimension as an input dimension.

In an exemplary embodiment, the calculating a similarity between the text feature and the video feature to determine a text-video similarity matrix specifically includes: calculating a vector inner product based on the text feature and the video feature to determine the text-video similarity matrix.

Further, the calculation of the vector inner product is transpose multiplication of a text feature matrix and a video feature matrix.

In a similarity calculation process, the text encoder is a text encode of a CLIP VIT-B/32 version, and the video encoder is an image encoder of the CLIP VIT-B/32 version.

Each row of the text-video similarity matrix corresponds to a similarity between the text and each video. Video numbers corresponding to k values with a highest similarity in one row can be used as a video retrieved for the text and displayed to a user.

Figure 5:
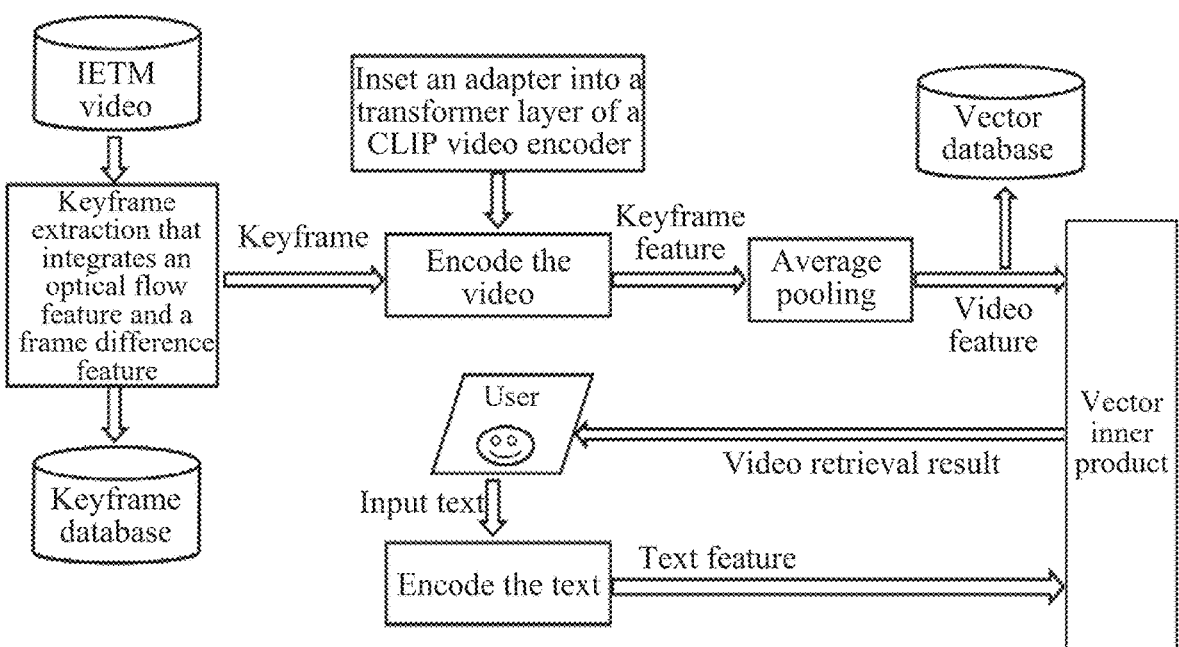
FIG. 5 is a schematic flowchart of video retrieval in IETM according to an embodiment of the present disclosure.

Whenever the user initiates video retrieval in IETM and inputs the video retrieval text, S3 is performed. Whenever a new IETM video is added to the database, S1 is performed. In an actual operation process, the video retrieval in IETM process is shown in FIG. 5.

In some optional implementations of some embodiments, the execution entity can control the communicatively-connected display device to display the video retrieval text and the video retrieval result, such that the operating device performs the video retrieval based on the video retrieval text.

Figure 4:
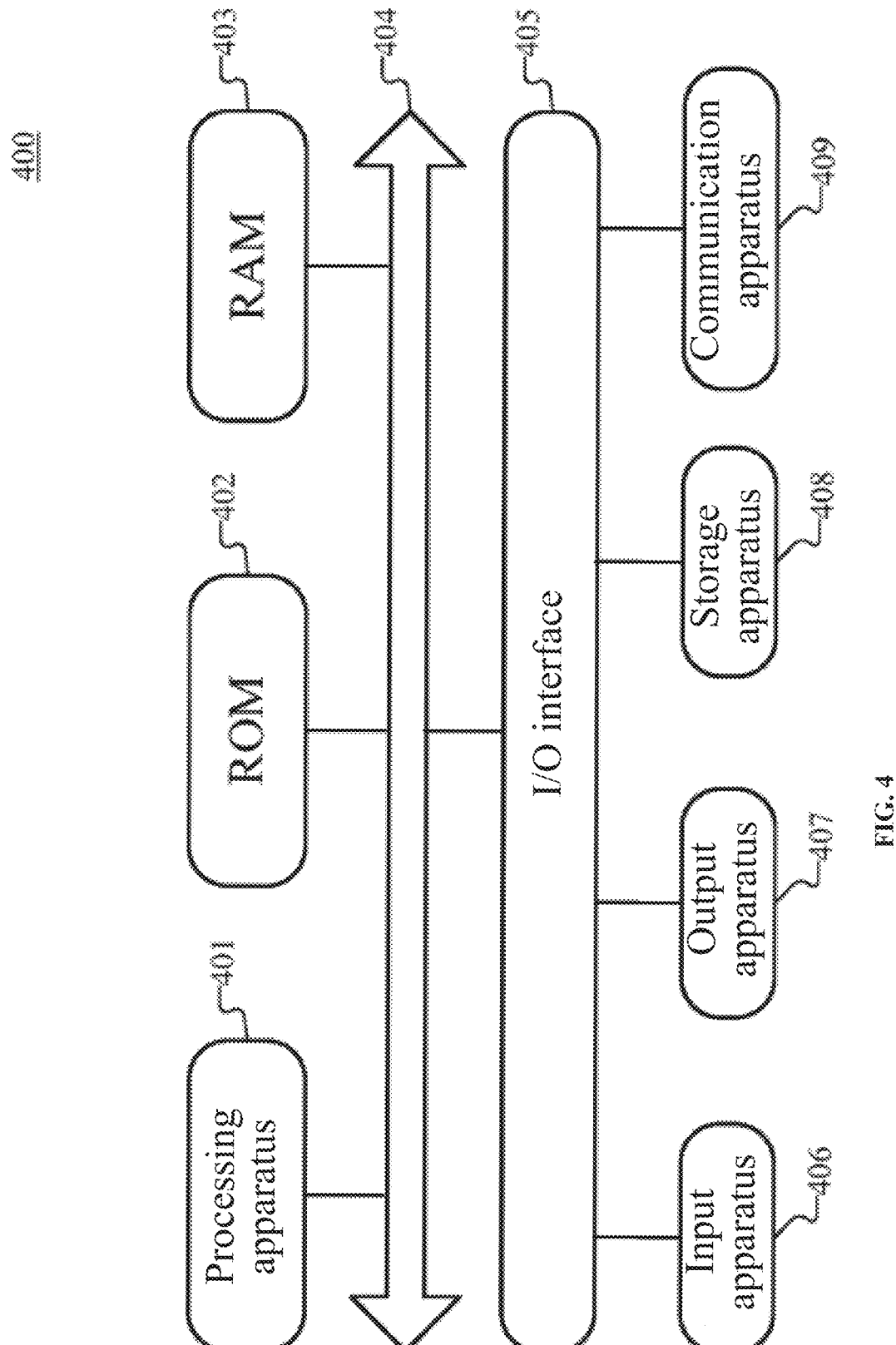
FIG. 4 is a schematic structural diagram of an electronic device according to an embodiment of the present disclosure.

FIG. 4 is a schematic structural diagram of an electronic device 400 suitable for implementing some embodiments of the present disclosure. A server shown in FIG. 4 is merely an example, and should not cause any limitation to the functions and application range of the embodiments of the present disclosure.

As shown in FIG. 4, the electronic device 400 may include a processing apparatus (such as a central processing unit (CPU) and a graphics processing unit (GPU)) 401, which can perform various suitable actions and processing according to a program stored in a read-only memory (ROM) 402 or a program loaded from a storage apparatus 408 to a random access memory (RAM) 403. The RAM 403 further stores various programs and data required for operations of the electronic device 400. The processing apparatus 401, the ROM 402, and the RAM 403 are connected to each other through a bus 404. An input/output (I/O) interface 405 is also connected to the bus 404.

Usually, the following apparatuses can be connected to the I/O interface 405: an input apparatus 406 including a touch screen, a touch tablet, a keyboard, a mouse, a camera, a microphone, an accelerometer, a gyroscope, and the like; an output apparatus 407 including a liquid crystal display (LCD), a speaker, a vibrator, and the like; the storage apparatus 408 including a magnetic tape, a hard disk, and the like; and a communication apparatus 409. The communication apparatus 409 may allow the electronic device 400 to exchange data with another device through wireless or wired communication. Although the electronic device 400 with various apparatuses is shown in FIG. 4, it should be understood that all shown apparatuses are implemented or provided unnecessarily. Alternatively, more or less apparatuses can be implemented or provided. In FIG. 4, each block may represent one apparatus, and may also represent a plurality of apparatuses as required.

Figure 6:
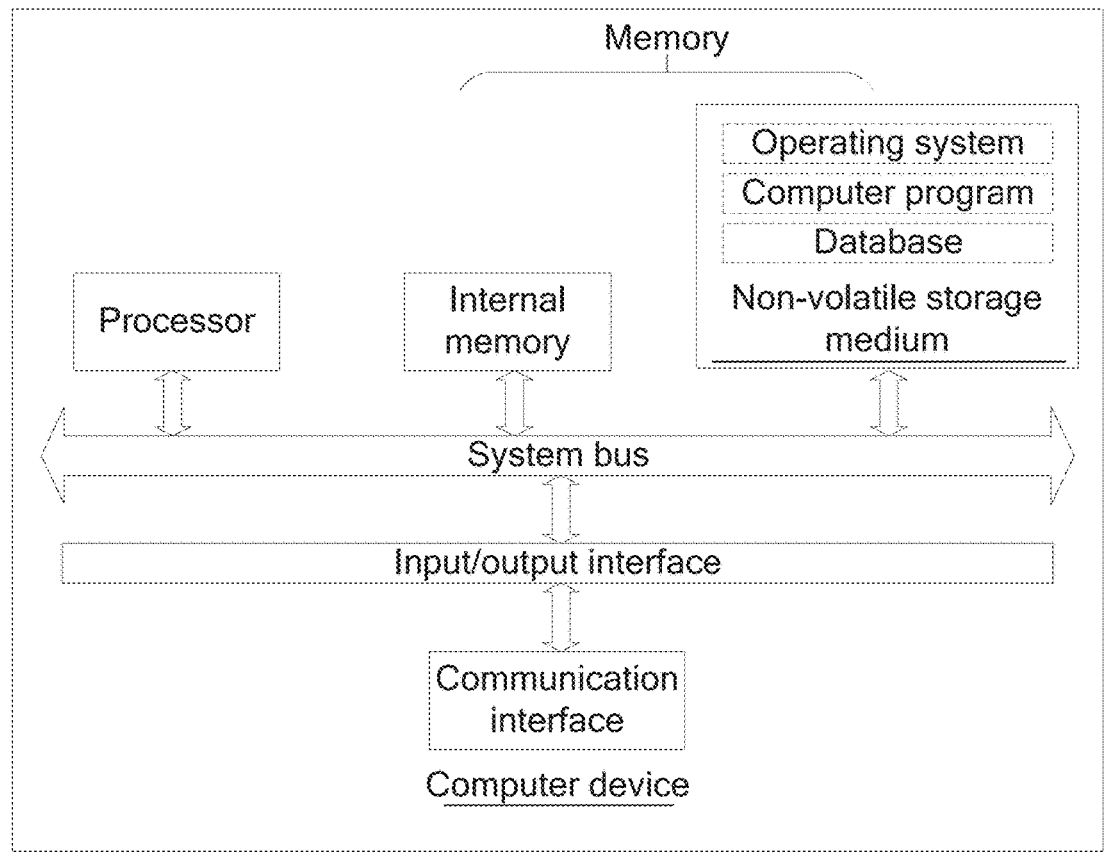
FIG. 6 is a schematic structural diagram of a computer device according to an embodiment of the present disclosure.

In an exemplary embodiment, a computer device is provided. The computer device may be a server or a terminal, and an internal structure thereof may be as shown in FIG. 6. The computer device includes a processor, a memory, an I/O interface, and a communication interface. The processor, the memory, and the I/O interface are connected through a system bus. The communication interface is connected to the system bus through the I/O interface. The processor of the computer device is configured to provide computing and control capabilities. The memory of the computer device includes a non-volatile storage medium and an internal memory. The non-volatile storage medium stores an operating system, a computer program, and a database. The internal memory provides an environment for running the operating system and the computer program in the non-volatile storage medium. The database of the computer device is configured to store video retrieval data, including a video, a keyframe, text, and a vector. The I/O interface of the computer device is configured to exchange information between the processor and an external device. The communication interface of the computer device is configured to communicate with an external terminal through a network. The computer program is executed by the processor to implement a video retrieval method.

In an exemplary embodiment, a computer device is provided, including a memory and a processor. The memory stores a computer program, and the computer program is executed by the processor to implement the above method.

In an exemplary embodiment, a computer-readable storage medium is provided. The computer-readable storage medium stores a computer program, and the computer program is executed by a processor to implement the above method.

In an exemplary embodiment, a computer program product is provided, including a computer program. The computer program is executed by a processor to implement the above method.

Those of ordinary skill in the art may understand that all or some of the procedures in the method of the foregoing embodiments may be implemented by a computer program instructing related hardware. The computer program may be stored in a non-volatile computer-readable storage medium. When the computer program is executed, the procedures in the embodiments of the above method may be performed. Any reference to a memory, a database, or other media used in the embodiments of the present disclosure may include at least one of a non-volatile memory and a volatile memory. The non-volatile memory may include a ROM, a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, and the like. The volatile memory may include a RAM or an external cache memory. As an illustration rather than a limitation, the RAM may be in various forms, such as a static random access memory (SRAM) or a dynamic random access memory (DRAM).

In the present disclosure, all actions for obtaining signals, information, or data are carried out in accordance with corresponding data protection regulations and policies of a country where the actions are performed, and with authorization granted by a corresponding apparatus owner.

The database in the embodiments of the present disclosure may include at least one of a relational database and a non-relational database. The non-relational database may include a blockchain-based distributed database, but is not limited thereto. The processor in the embodiments of the present disclosure may be a general processor, a CPU, a GPU, a digital signal processor (DSP), a programmable logic device, a data processing logic device based on quantum computing, and the like, but is not limited thereto.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

Specific examples are used herein for illustration of the principles and implementations of the present disclosure. The description of the above embodiments is used to help illustrate the method of the present disclosure and the core principles thereof. In addition, those of ordinary skill in the art can make various modifications in terms of specific implementations and scope of application in accordance with the teachings of the present disclosure. In conclusion, the content of the specification shall not be construed as a limitation to the present disclosure.

What is claimed is:

1. A video retrieval method, comprising:
   extracting a keyframe of a video from an Interactive Electronic Technical Manual (IETM) common source database (CSDB) in an IETM platform,
   transferring the keyframe to a Contrastive Language-Image Pre-training (CLIP) encoder, and
   storing the keyframe in a keyframe database,
   wherein the IETM CSDB comprises a video database, the keyframe database, a text database, and a vector database; the CLIP encoder comprises a CLIP image encoder and a CLIP text encoder; an adapter is inserted into a transformer layer of the CLIP image encoder; and the adapter is used for parameter-efficient fine-tuning;

using the CLIP image encoder to encode the keyframe to determine a fused vector of all keyframe features, and storing the fused vector in the vector database as a video feature;

using the CLIP text encoder to encode video retrieval text to determine a text feature, and storing the text feature in the text database, wherein the video retrieval text is video retrieval text input by a client into the IETM platform;

calculating a similarity between the text feature and the video feature to determine a text-video similarity matrix; and performing video retrieval based on the text-video similarity matrix, and determining a video retrieval result, wherein the IETM platform comprises a communicatively-connected display device, and controls the communicatively-connected display device to display the video retrieval text and the video retrieval result, such that an operating device performs the video retrieval based on the video retrieval text.

2. The video retrieval method according to claim 1, wherein the extracting a keyframe of a video from an IETM CSDB in an IETM platform comprises:

extracting pixel brightness between two adjacent frames in the video based on an optical flow method to determine an optical flow feature;

extracting a pixel difference between the two adjacent frames in the video based on a frame difference method to determine a frame difference feature; and determining the keyframe of the video based on the optical flow feature and the frame difference feature.

3. The video retrieval method according to claim 2, wherein the determining the keyframe of the video based on the optical flow feature and the frame difference feature comprises:

evaluating the frame difference feature separately by using a frame difference mean, a frame difference variance, and a difference coefficient, and determining an evaluation result of the frame difference feature, wherein the difference coefficient is a ratio of the frame difference variance to the frame difference mean; and determining the keyframe of the video based on the optical flow feature and the evaluation result of the frame difference feature.

4. The video retrieval method according to claim 1, wherein the using the CLIP image encoder to encode the keyframe to determine a fused vector of all keyframe features comprises:

using the CLIP image encoder to encode the keyframe to determine a keyframe feature; and performing an average pooling operation to merge all the keyframe features into the fused vector.

5. The video retrieval method according to claim 1, wherein the using the CLIP text encoder to encode video retrieval text to determine a text feature comprises:

using the CLIP text encoder to perform word segmentation, molecular word division, and tokenization on the video retrieval text to convert the video retrieval text into a token sequence, wherein the token sequence is the text feature.

6. The video retrieval method according to claim 1, wherein after the using the CLIP text encoder to encode video retrieval text to determine a text feature, further comprising:

using the CLIP encoder to calculate a cosine distance between each text feature and each video feature based on symmetric cross entropy to generate an image-text pair;

determining, based on the cosine distance, whether a text feature and a video feature in the image-text pair are matched; and if the text feature and the video feature in the image-text pair are matched, storing the image-text pair in the IETM CSDB; or if the text feature and the video feature in the image-text pair are not matched, discarding the image-text pair.

7. The video retrieval method according to claim 6, wherein the determining, based on the cosine distance, whether a text feature and a video feature in the image-text pair are matched comprises:

when a cosine distance of the image-text pair is within a first distance range, determining that the text feature and the video feature in the image-text pair are matched; or when a cosine distance of the image-text pair is within a second distance range, determining that the text feature and the video feature in the image-text pair are not matched.

8. The video retrieval method according to claim 1, wherein the calculating a similarity between the text feature and the video feature to determine a text-video similarity matrix comprises:

calculating a vector inner product based on the text feature and the video feature to determine the text-video similarity matrix.

9. A computer device, comprising: a memory, a processor, and a computer program stored in the memory and executable on the processor, wherein the processor executes the computer program to implement the video retrieval method according to claim 1.

10. A non-transitory computer-readable storage medium, storing a computer program thereon, wherein the computer program is executed by a processor to implement the video retrieval method according to claim 1.

11. The computer device according to claim 9, wherein the extracting a keyframe of a video from an IETM CSDB in an IETM platform comprises:

extracting pixel brightness between two adjacent frames in the video based on an optical flow method to determine an optical flow feature;

extracting a pixel difference between the two adjacent frames in the video based on a frame difference method to determine a frame difference feature; and determining the keyframe of the video based on the optical flow feature and the frame difference feature.

12. The computer device according to claim 11, wherein the determining the keyframe of the video based on the optical flow feature and the frame difference feature comprises:

evaluating the frame difference feature separately by using a frame difference mean, a frame difference variance, and a difference coefficient, and determining an evaluation result of the frame difference feature, wherein the difference coefficient is a ratio of the frame difference variance to the frame difference mean; and determining the keyframe of the video based on the optical flow feature and the evaluation result of the frame difference feature.

13. The computer device according to claim 9, wherein the using the CLIP image encoder to encode the keyframe to determine a fused vector of all keyframe features comprises:

using the CLIP image encoder to encode the keyframe to determine a keyframe feature; and performing an average pooling operation to merge all the keyframe features into the fused vector.

14. The computer device according to claim 9, wherein the using the CLIP text encoder to encode video retrieval text to determine a text feature comprises:

using the CLIP text encoder to perform word segmentation, molecular word division, and tokenization on the video retrieval text to convert the video retrieval text into a token sequence, wherein the token sequence is the text feature.

15. The computer device according to claim 9, wherein after the using the CLIP text encoder to encode video retrieval text to determine a text feature, further comprising:

using the CLIP encoder to calculate a cosine distance between each text feature and each video feature based on symmetric cross entropy to generate an image-text pair;

determining, based on the cosine distance, whether a text feature and a video feature in the image-text pair are matched; and if the text feature and the video feature in the image-text pair are matched, storing the image-text pair in the IETM CSDB; or if the text feature and the video feature in the image-text pair are not matched, discarding the image-text pair.

16. The computer device according to claim 15, wherein the determining, based on the cosine distance, whether a text feature and a video feature in the image-text pair are matched comprises:

when a cosine distance of the image-text pair is within a first distance range, determining that the text feature and the video feature in the image-text pair are matched; or when a cosine distance of the image-text pair is within a second distance range, determining that the text feature and the video feature in the image-text pair are not matched.

17. The computer device according to claim 9, wherein the calculating a similarity between the text feature and the video feature to determine a text-video similarity matrix comprises:

calculating a vector inner product based on the text feature and the video feature to determine the text-video similarity matrix.

18. The non-transitory computer-readable storage medium according to claim 10, wherein the extracting a keyframe of a video from an IETM CSDB in an IETM platform comprises:

extracting pixel brightness between two adjacent frames in the video based on an optical flow method to determine an optical flow feature;

extracting a pixel difference between the two adjacent frames in the video based on a frame difference method to determine a frame difference feature; and determining the keyframe of the video based on the optical flow feature and the frame difference feature.

19. The non-transitory computer-readable storage medium according to claim 18, wherein the determining the keyframe of the video based on the optical flow feature and the frame difference feature comprises:

evaluating the frame difference feature separately by using a frame difference mean, a frame difference variance, and a difference coefficient, and determining an evaluation result of the frame difference feature, wherein the difference coefficient is a ratio of the frame difference variance to the frame difference mean; and determining the keyframe of the video based on the optical flow feature and the evaluation result of the frame difference feature.

20. The non-transitory computer-readable storage medium according to claim 10, wherein the using the CLIP image encoder to encode the keyframe to determine a fused vector of all keyframe features comprises:

using the CLIP image encoder to encode the keyframe to determine a keyframe feature; and performing an average pooling operation to merge all the keyframe features into the fused vector.

* * * * *